No. 765,304. PATENTED JULY 19, 1904.
C. B. BISHOP.
MACHINE FOR MAKING CUT GLASS.
APPLICATION FILED JULY 25, 1903.
NO MODEL. 4 SHEETS—SHEET 2.

Witnesses:
Chas. F. Schmelz
Frances E. Blodgett

Inventor:
C. B. Bishop
By his Attorney
Wm. H. F. Blodgett

No. 765,304. PATENTED JULY 19, 1904.
C. B. BISHOP.
MACHINE FOR MAKING CUT GLASS.
APPLICATION FILED JULY 25, 1903.
NO MODEL. 4 SHEETS—SHEET 3.

Witnesses:

Inventor:
C. B. Bishop,
By his Attorney

No. 765,304. PATENTED JULY 19, 1904.
C. B. BISHOP.
MACHINE FOR MAKING CUT GLASS.
APPLICATION FILED JULY 25, 1903.
NO MODEL. 4 SHEETS—SHEET 4.

Witnesses:
Chas. P. Schmelz
Frances E. Blodgett

Inventor:
C. B. Bishop,
By his Attorney

No. 765,304.

Patented July 19, 1904.

UNITED STATES PATENT OFFICE.

CHARLES B. BISHOP, OF NEW BRITAIN, CONNECTICUT.

MACHINE FOR MAKING CUT GLASS.

SPECIFICATION forming part of Letters Patent No. 765,304, dated July 19, 1904.

Application filed July 25, 1903. Serial No. 166,995. (No model.)

*To all whom it may concern:*

Be it known that I, CHARLES B. BISHOP, a citizen of the United States, residing at New Britain, in the county of Hartford and State of Connecticut, have invented certain new and useful Improvements in Machines for Making Cut Glass, of which the following is a specification.

This invention relates to the art of manufacturing cut glassware; and it has for one of its objects the provision of a machine whereby glass blanks of different shapes and sizes may be cut in accordance with various predetermined designs and ornaments and without the employment of skilled labor.

A further object of the invention is the provision of a machine in which the blank to be cut may be presented to the cutting-wheel in different positions, so that cuts having an angular or other desired relation to the axis of said blank may be produced.

A further object of the invention is the provision in connection with a blank support or holder of interchangeable devices for indexing said holder to cause the blank to be presented to the cutting-wheel in accordance with a predetermined design, thus enabling grooves to be cut at the required points without liability of mistake.

A further object of the invention is the provision of means for moving the blank-support bodily past the cutting-wheel and for holding the same in predetermined positions relatively to the cutting edge of said wheel, these means comprising interchangeable indexing devices for controlling the positions of the blank to cause the cuts to be made in accordance with the design to be reproduced.

A further object of the invention is the provision of interchangeable patterns or formers for controlling the movement of the blank-support toward the cutting instrument.

A further object of the invention is the provision of improved indexing and former or pattern controlling devices.

Further objects of the invention will be hereinafter set forth.

One of the principal aims of the invention is the provision of a machine in which the blank to be cut may be properly presented to the action of the cutting, polishing, or other wheel and in which the liability of mistakes or irregularities in spacing the cuts according to the pattern or design shall be minimized, a feature which is of great importance when it is considered that the value and beauty of the article depends almost entirely upon the manner in which the several cuts coöperate in producing esthetic effects, smoothness of cut and regularity in depth and spacing being essential in all fine or precisionized work. Inasmuch as the machine is adapted to produce a design of any desired kind and the lines on which the work is cut must therefore be subject to many changes there is shown in the present instance a machine in which the blank may be presented at various angles and planes relatively to the cutting edge of the wheel or other cutting or grinding instrument employed.

In the accompanying drawings, in which similar characters denote similar parts.

In the drawings the improved machine is illustrated comprising a pair of side frames 20 21, tied together by rods 22, and secured upon the frame 21 is a head 23, having bearings 24, in which is journaled a spindle 25, shown rotated by a belt in engagement with a cone-pulley 26, said spindle carrying at its outer end a cutting-wheel 27, secured thereto in any convenient manner.

Other means may be employed for actuating the cutting-wheel, if desired. Here it may be stated that the character of wheel 27 employed is immaterial, as a polishing or other wheel may be substituted for the cutting-wheel shown, if desired.

Suspended above the wheel in use, which may be a grinding, smoothing, or polishing wheel, is the usual reservoir R, containing sand and water or water alone when smoothing is to be done, the flow of which may be regulated by a valve V and conducted to the wheel 27 by a trough T.

Secured to and mounted for vertical adjustment on the side frames 21 and 22 is a support 30, provided with slots 31 for the passage of clamping-bolts 32, carried by said frames. Upon the support is a frame 33, pivoted at 34 and having curved slots 35 to permit of accurate adjustment, clamp-bolts 36 passing through said slots and serving to secure the frame in position.

Figure 4:
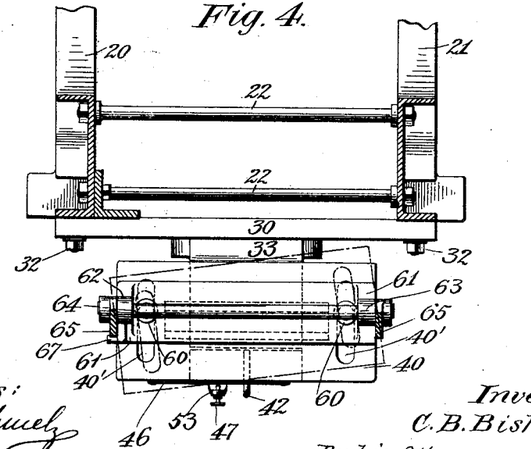
Fig. 4 is a horizontal section on line 4 4 of Fig. 1.
Figure 9:
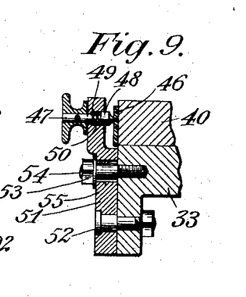
Fig. 9 is a central vertical section thereof.
Figure 10:
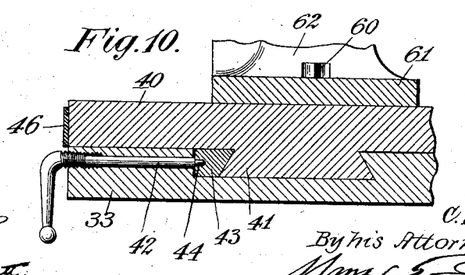
Fig. 10 is a sectional view representing in detail the table and transversely-movable slide for the blank and pattern.

Mounted for movement on the frame 33 transversely of the cutting-wheel 27 is a slide 40, having a dovetail projection 41 in engagement with a correspondingly-shaped groove in the frame and adapted to be clamped in place by a screw 42, engaging a gib 43, which may be held against a longitudinal sliding movement by a projection 44, as shown in Fig. 10. Secured to slide 40 is a plate 46, having a series of apertures 45, and when the screw 42 is loosened the slide 40 may be moved longitudinally to bring any one of said apertures opposite a stop-pin 47. (See Fig. 9.) This pin has preferably an enlarged head 48, serving as an abutment for a spring 49, the other end of which rests against the bottom of a recess 50, formed in a bracket 51, which is pivoted at 52 on the frame 33, a nut 53 in screw-threaded engagement with a bolt 54 serving firmly to clamp the bracket 51 in position, and the aperture 55, through which the bolt 54 passes, being larger in diameter than said bolt, to permit the bracket to have a slight angular movement around the pivot 52 for a purpose hereinafter set forth. Secured to the slide 40 by bolts 60 is a plate 61, and said slide has transverse slots 40' of length and width to permit the plate not only to be moved bodily toward and away from the cutting-wheel, but also to allow the same to be adjusted at an angle to the axis of said wheel, as shown by dot-and-dash lines in Fig. 4. Plate 61 is provided with standards 62 63, constituting bearings for a rock-shaft 64, each end of which carries an arm 65, secured thereto by a pin 66, so as to move in unison, the backward movement of said arms being limited by a stop 67, formed on the standard 62, above mentioned.

Figures 2, 13:
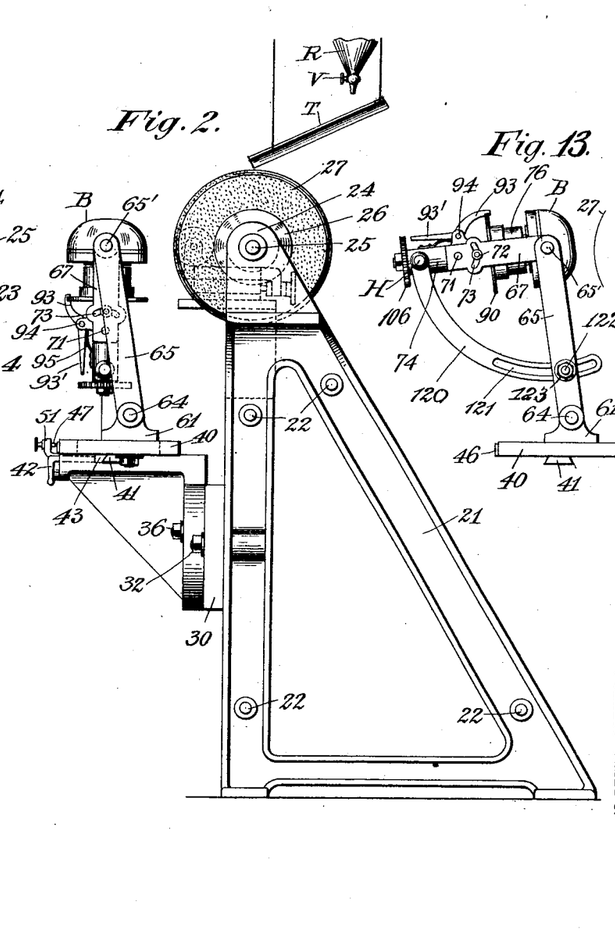
Fig. 2 is a side view thereof looking from the right of Fig. 1.
Fig. 13 illustrates an attachment hereinafter described.

Pivoted at 65' to and depending from the upper ends of the arms 65 are links 67, the lower ends of which are secured to a frame 70, pivoted at 71 on the links, as shown in Fig. 2, while bolts 72, passing through slots 73 of the links, serve to secure the parts firmly together and also enable said links to be adjusted in an arcuate path and then secured in place.

Figures 5, 6, 7:
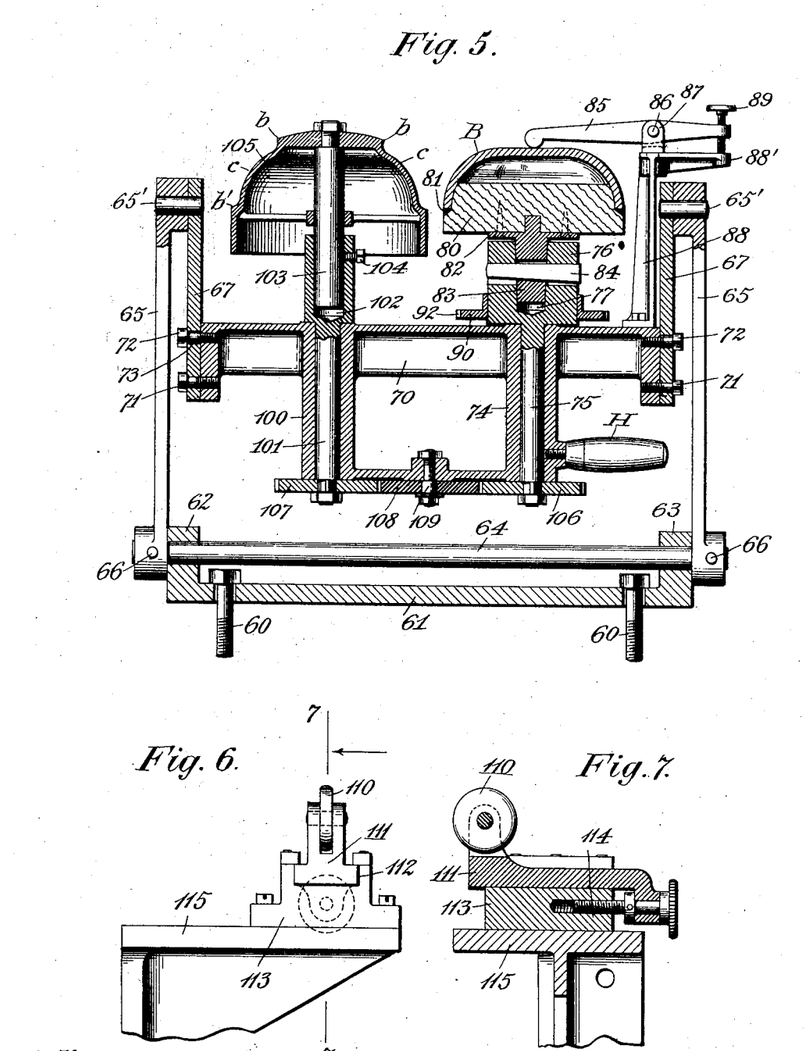
Fig. 5 is a central longitudinal section of the blank and pattern supporting frame on an enlarged scale.
Fig. 6 is a front view of the pattern gage-roller and its support.
Fig. 7 is a section on line 7 7 of Fig. 6.

Referring to Fig. 5, it will be seen that the frame 70 is provided with a bearing 74 for the reception of an arbor 75, the upper end of which carries a head 76, having a tapered recess 77. Head 76 constitutes the support or carrier for the blank to be cut, and as the arbor 75 of said head is mounted for intermittent rotation in the bearing 74 any desired part of the surface of the blank to be cut may be presented to the action of the wheel 27.

Although it is immaterial how the blank B may be held on the arbor, I have illustrated one form of holder for such purpose, said holder comprising a block 80, which conforms to some extent to the interior of the blank and with which the latter may be united—as, for instance, by sealing-wax or other cementitious substance, as indicated at 81. Said block 80 is preferably made of wood and is secured to a metallic plate 82, which is provided with a tapered shank 83, adapted to fit into the similarly-formed recess 77 of the head 76, in which it is secured by a key 84 or otherwise. In order to prevent the blank from becoming detached from the block 80, extraneous clamping means may be employed, said means comprising in the form thereof shown a lever 85, fulcrumed at 86 in a swivel-block 87, which may be rotatably held in a standard 88, rising from the frame 70. At its rear end the lever 85 carries a thumb-screw 89, the extremity of which rests against an arm 88', projecting from the standard 88, so that by turning said screw the lever 85 may be caused either to engage or release the blank, in which latter case said lever may be swung around horizontally to permit the blank to be removed and another to be substituted therefor when required.

Means are provided for holding the arbor, and therefore the blank B, against rotation during the cutting operation, these means comprising an index-plate 90, (see Fig. 11,) which may be held on the head 76 by a set-screw 91 or otherwise, and the periphery of which is provided with a series of notches 92, corresponding to the cuts to be produced on the blank. These notches 92 are adapted to be engaged by a detent 93, (see Fig. 2,) pivoted at 94 on the bearing 74 and actuated by a spring 95, while said detent may be disengaged from the notches 92 by pressing upon the tailpiece 93', as will be readily understood.

Figure 11:
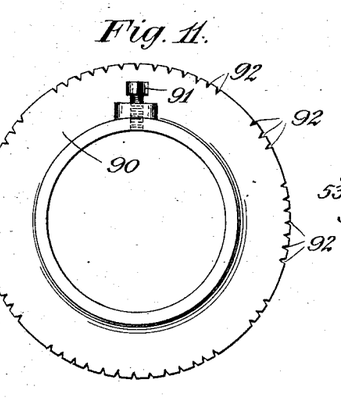
Fig. 11 is a top view of the axial indexing device.
Figure 12:
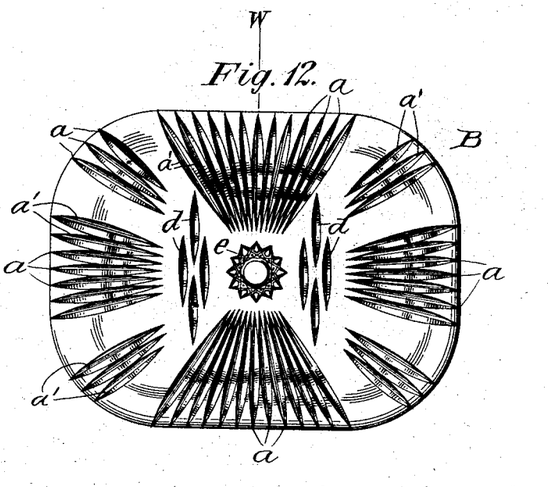
Fig. 12 illustrates one kind of an ornamental glass dish which may be produced by the improved machine.

As shown in Fig. 11, the notches 92 are spaced circumferentially to index the arbor 75 properly to bring the blank B into contact with the cutting-wheel, so that the latter may cut on the radial lines $a$ in Fig. 12, which represents a glass dish properly cut according to the design, the position of the wheel cutting edge being indicated by the line $w$, which would intersect the axis of rotation of the blank.

From the above description it will be seen that the frame 70 may have two movements— viz., a partial revolution around the pivots 65' and a rocking movement with the arms 65 toward or away from the cutting-wheel—a handle H being provided to facilitate manipulation of said frame when bringing the blank into contact with the cutting-wheel.

To enable a number of articles to be produced, all of which shall be cut alike and uniformly, the several cuts starting and stopping at similar places on the blank-surface, the improved machine comprises a pattern or former coöperating with a gage-wheel, whereby the depth of the cut may be regulated and which will also permit the movement of the blank to be varied to compensate for the wear of the cutting-wheel, it being understood, of course, that as the wheel wears off the blank should necessarily be advanced farther inward.

Figure 1:
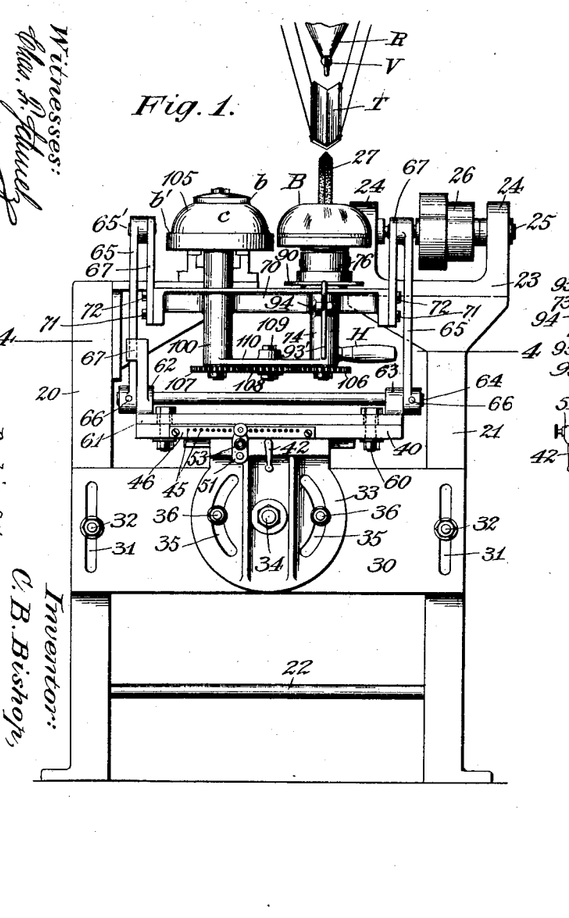
Figure 1 is a front view of a machine embodying my invention.
Figure 3:
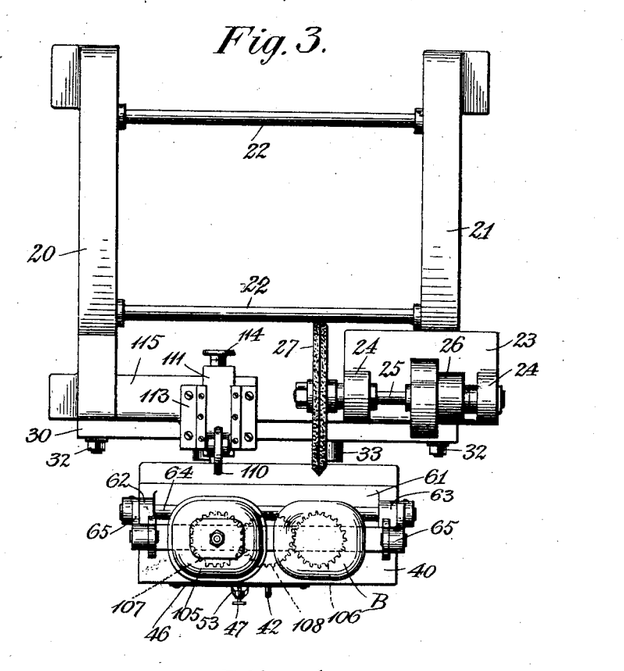
Fig. 3 is a top view of the machine.

Referring to Fig. 5, it will be seen that the frame 70 is also provided with a bearing 100 for an arbor 101, the upper end of which is chambered, as at 102, to receive a spindle 103, which may be adjusted vertically therein and secured in position by a set-screw 104 and which supports the model or pattern 105, as clearly shown in Figs. 1, 3, and 5, and in order to insure equal rotative movements of both blank and pattern the lower ends of the arbors 75 and 101 carry similar gears 106 107, respectively, in engagement with an intermediate gear 108, journaled on a stud 109, which may be secured in a web 110, connecting the bearings 74 and 100.

Coöperating with the pattern 105 is a gage-wheel 110, whereby the depth of cut to be made in the blank may be regulated, this wheel being preferably journaled in the forward end of a slide 111, guided in ways 112 of a block 113, in which the slide may be adjusted by a screw 114. (See Fig. 7.) This block 113 may be secured to the top of a bracket 115, attached to the upper end of the side frame 20 and in such a manner that the center line of the gage-wheel and its slide 111 will be in alinement with and intersect the axis of the pattern-arbor 101, while the edge of the cutting-wheel 27 is in alinement with the axis of the blank-supporting arbor 75. From this it follows that the cutting-wheel will act on the blank in the same place in which the gage-wheel engages the pattern circumferentially and, furthermore, that the depth of cut in the blank at that place is controlled by the form of the pattern in conjunction with the position of the gage-wheel.

In the drawings the blank is shown oblong in shape, having rounded sides and a flat bottom, so that when it is desired to produce cuts like those indicated by $a$ the cutting-wheel must be permitted to cut deeper near the middle portion longitudinally of the cut and the withdrawal of the blank from the wheel must be gradual. Hence the pattern is formed so as to accomplish this result by having projecting portions or ledges $b$ $b'$ adapted to act as stops and engage the gage-wheel 110 when the frame 70 is swung around its supporting-trunnions 65' and pushed bodily forward toward the cutting-wheel, it being understood, of course, that the depressed or other surface $c$ of the pattern between the stops is shaped to conform to the required cut.

As it is difficult to produce a clean and smooth cut in the glass at one operation and if such were attempted the "drag" on the cutting-wheel would be excessive when the full depth of the cut is reached, it is preferable to go over the same cut a number of times and to permit the depth of cut to be increased with each succeeding operation by successively moving the gage-wheel 110 rearward, and thus allowing the blank to be progresively forced inward toward the wheel until the desired depth has been attained. Furthermore, when finishing the sides of some cuts it is preferable to operate on one side of each cut at a time, and this may be readily accomplished by adjusting the bracket 51 of the indexing device for the slide 40.

Figure 8:
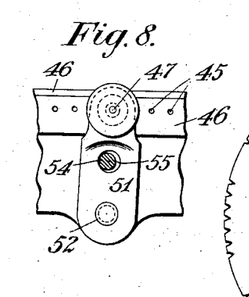
Fig. 8 is a detail view of the transverse indexing device.

Referring to Fig. 8, it will be seen that said bracket 51 has been moved substantially to its extreme position toward the right, where it is clamped rigidly in place by the nut 53, and in this instance the left sides of the cuts (indicated by $a'$) may be finished. When this adjustment of said bracket is made, the slide 40 and index-plate 46, in an opening of which the pin 47 is placed, are also moved a slight distance toward the right, thereby carrying the blank-supporting and pattern devices in the same direction, and thus so locating the blank that the wheel will dress the left side of the cut. After the left side of one cut has been dressed the plate 90 will be indexed to turn the blank-holder intermittingly until the left side of another cut is brought into position for the dressing operation, and so on until the left sides of all the cuts have been operated upon by the wheel 27, after which the nut 53 will be turned to release the bracket 51, and thereby so locate the parts that the cutting-wheel will operate upon the right side of a cut and upon the same side of each succeeding cut of the series, the plate 90 being of course then again indexed properly to space the cut.

Referring now to Fig. 13, the numeral 120 designates a link having a slot 121, said link being connected to bearing 74 at one end and its slot receiving a bolt 122 of one of the arms 65, the bolt being secured in place by a nut 123 for a purpose hereinafter described.

My improved machine operates as follows: One of the interchangeable index-plates 90 for determining the angular rotation of the blank-supporting arbor 75 is placed in position. The block 80, carrying the blank B, is then secured to said arbor by the key 84, and the lever 85 is brought into engagement with the blank and forced against the same by screw 89. An interchangeable pattern 105 of the desired form to produce the required design is then mounted upon the arbor 103 in such a manner that similar portions of the pattern and the blank will be opposite the edges of the gage-wheel 110 and cutting-wheel 27, respectively, and said wheel 27 being set in motion and a supply of sand and water furnished thereto by opening the valve V the operator grasps the handle H with his right hand, pushing with his other hand against the upper end of the left arm 65, and thus bringing the surface of the pattern, or more specifically the ledge or stop $b'$ thereof, into contact with the gage-wheel 110, the position of which is such as to permit the cutting-wheel 27 to clear the blank. By now swinging the frame 70 around its trunnions 65' the blank will be rolled in front of the cutting-wheel in conformity to the shape of the surface $c$ of the pattern 105 in use, said wheel cutting into the glass and again clearing it when the ledge or stop $b$ engages the gage-wheel 110. By now indexing the blank-arbor 75 until the detent 93 enters the next succeeding notch of the plate 90 (this action resulting by virtue of the gearing 106, 107, and 108 in a similar and simultaneous movement of the pattern 105) the blank is turned to bring a new space thereof opposite the wheel, whereupon the frame 70 is again manipulated, as before, and the wheel 27 will consequently make a second cut, governed by the surface $c$ of the pattern into the blank, these operations being repeated until all the peripheral cuts (indicated by $a$ in Fig. 12) have been made, said cuts being preferably of but partial depth. Slide 111 is now moved slightly rearward, and the frame 70 is manipulated as before, and the same procedure is carried out repeatedly until the full depth of cut has been obtained. If desired, however, each cut may be made of full depth at a single operation.

From what has been stated it will be seen that provision is made for many kinds of adjustment by which the blank-support may be presented at various angles to the tool employed. Thus by first moving the slide 40 and then releasing the nuts 36 the parts carried by the slide 40 may be tilted on the pivot-bolt 34 to present the blank B in an inclined position laterally to the cutting or polishing implement employed, so that said implement will then produce or polish diagonal cuts or lines on said blank. When the blank-support is tilted at the desired angle to the right and the frame 33 is locked in such position by the nuts 36, lines or cuts inclined to the right may be formed, and when said frame is tilted toward the left lines or cuts inclined toward the left will result when the blank is forced against the implement. By loosening the nuts 60 the plate 61 may be adjusted in a horizontal plane in an arcuate path to present the blank-holder at still different angles to the implement, and said plate may also be moved back and forth upon the slide 40 to locate the size of blank to be operated upon properly with relation to the cutting, smoothing, or polishing tool, and by loosening the bolts 72, passing through the curved slots 73 of links 67, the frame 70 may be adjusted on said links to vary the angle or "dip" of the blank-support with relation to the tool. Frames 33 70 and all the parts carried by said frames may also be vertically adjusted on the standards 20 21 by loosening the bolts 32, moving the slotted cross-strip 30 up or down, and then retightening said bolts.

In forming the drop cuts $d$ on the bottom of the glass (shown in Fig. 12) the slide 40 is indexed longitudinally by plate 46 and stopping 47, and then by swinging the frame 70 by handle H to the proper position, as shown in Fig. 13, the bottom of the blank may be presented to the action of tool 27, and after one cut has been made the slide 40 is again indexed to determine the desired spacing of the cuts, and these operations are repeated until the desired number of cuts is obtained. When this operation is to be carried out, the attachment, consisting of a curved link 120, having a slot 121, through which passes a bolt 122, secured by a nut 123, is utilized to lock the frame 70 in position, after which said cuts $d$ may be formed by grasping handle H and forcing the frame 70 and arms 65 inward toward the wheel 27 until the top of the former engages roll 110 or other stop. In virtue of this attachment the frame 70 may be adjusted to present the blank B at the desired angle to the wheel 27 and then firmly secured in position by tightening nut 123, and after one cut $d$ has been formed the others may be produced by indexing the slide 40 in the manner above described. Other means may be substituted for locking the frame in the positions just described without departure from the invention. Cuts on tangential lines may also be readily produced by angularly adjusting the frame 33, carrying slide 40, so that the edge of the wheel 27 will be presented to the blank in the desired position.

To form an ornament or star like that indicated by $e$ in Fig. 12, the slide 40 is indexed to position the blank properly with relation to the cutting-wheel, and the arbor 75 is then indexed about thirty degrees after each cut has been made.

From what has been stated it is evident that ornaments and designs of any desired kind may be accurately produced and that with a former or pattern of one shape a set of articles each having the same precisionized ornamental surface may be readily made.

As will be seen by reference to Figs. 1 and 5, each interchangeable former 105 is provided with stops b b' and an intermediate surface c, which determines the vertical outline of the cut. This surface c is plain or smooth, and when the frame 70 is actuated to present the blank to the cutting-wheel 27 or other implement in use on the spindle 25 said blank will be forced to engage the implement on a line indicated by the contour of said surface c. As above stated, a series of interchangeable formers will be supplied for controlling the formation of the design in the blank, and to utilize the machines in the manufacture of cut glass several of them may be employed, one of which will form certain cuts in the blank, a second another set of cuts, and a third another, and so on. When it is desired to change the former and blank-holder of a machine, they are withdrawn and others substituted, and this may be readily accomplished, for each interchangeable blank-holder is provided with a like slotted shank 83 to fit the head 76 and be secured by key 84, and each interchangeable former or templet is equipped with a like spindle 103 to enter the arbor 101 and be clamped in place by screw 104. It is distinctly to be understood that any desired implement may be attached to the spindle 25 as a substitute for the grinding-wheel 27 shown. For instance, said wheel may be replaced by the usual steel disk, by a polishing-wheel, or by a buffing device or other instrument employed in the art of manufacturing cut glass. It is also evident that by changing the former and by substituting different sizes of blank-holding chucks articles widely varying in shape may be ornamented in the manner desired.

While manually operated indexing and blank-supporting mechanisms are described, it is distinctly to be understood that said mechanisms might be actuated in other ways without departure from the invention, which is not limited in these respects. So, too, certain parts of the invention may be used independently of the others and in different relations from those shown, if desired.

Other forms of blank-supporting and indexing mechanism may also be employed and the parts may be differently located and differently proportioned with relation to each other without departure from the invention.

While the machine is primarily intended for cutting or ornamenting glass, it is not limited to any specific use, for it may be employed for ornamenting other material and its principle may be utilized in various arts.

Having thus described my invention, what I claim is—

1. The combination, with a blank-carrier, of a tool for operating on a blank supported by said carrier; and means for actuating one of said elements over the surface of the other in an arcuate path.

2. The combination, with a blank-carrier, of a tool for operating on a blank supported by said carrier; means for actuating one of said elements over the other in an arcuate path; and a former for controlling the movement of one of the elements.

3. The combination, with a blank-carrier, of a tool for operating on a blank supported by said carrier; means for rolling one of said elements over the other in an arcuate path; and means for indexing the blank-carrier.

4. The combination, with a blank-carrier, of a tool for operating on a blank supported by said carriers; means for rolling one of said elements over the other in an arcuate path; a former for controlling the movement of the rolling element; and means for indexing said blank-carrier.

5. The combination, with a blank-carrier, of a tool for operating on a blank supported by said carrier; means for actuating one of said elements with relation to the other; mechanism for axially indexing the blank-carrier; and means for transversely indexing said blank-carrier.

6. The combination, with a blank-carrier, of a tool for operating on a blank supported by said carrier; means for axially indexing the blank-carrier; means for transversely indexing the blank-carrier; and means for forcing said blank-carrier toward the tool.

7. The combination, with a blank-carrier, of a tool for operating on a blank supported by said carrier; a swinging frame on which the carrier is mounted; means carried by said frame for axially indexing the blank-carrier; and means also carried by the frame for transversely indexing said blank-carrier.

8. The combination, with a blank-carrier, of a swinging frame for supporting said carrier; a former also supported by said swinging frame; means for axially indexing the former and the blank-carrier; and means for transversely indexing said blank-carrier.

9. The combination, with a blank-carrier, of a tool for operating on a blank supported by said carrier; a swinging frame; means for axially indexing the blank-carrier; means for transversely indexing said blank-carrier; and means for adjusting the swinging frame at the desired angle to the tool.

10. The combination, with a swinging frame, of a blank-carrier journaled in said frame; a former also journaled in the frame; gearing, including an idler, for connecting the blank-carrier and former; and means for axially indexing the blank-carrier, and, simultaneously therewith, the former.

11. The combination, with a blank-carrier, and with means for axially indexing the same, of a frame to which said carrier is connected; means for transversely indexing said frame; a tool; and means for actuating the blank-carrier toward and from said tool.

12. The combination, with a blank-carrier, of a frame for supporting the same; a tool; means whereby said frame may be actuated toward and from the tool; and means for further actuating the frame to impart a rolling movement of the blank supported by said blank-carrier with relation to the tool.

13. The combination, with a blank-carrier, of a tool for operating on a blank supported by said carrier; a frame to which the blank-carrier is connected; links carried by said frame; and rocking supports to which said links are pivoted.

14. The combination, with a frame, of arms to which said frame is connected for swinging movement; a blank-carrier supported on the frame; a support to which the arms are connected for rocking movement; and a tool over which the blank is carried by the blank-carrier.

15. The combination, with a frame, and a blank-carrier supported thereby, of links connected to the frame; arms to which the links are pivoted; and a support to which said arms are connected for rocking movement.

16. The combination, with a frame, and with a blank-carrier supported thereon, of links adjustably connected to said frame; and swinging arms to which said links are pivoted.

17. The combination, with a frame, and with a blank-carrier supported thereon, of links having curved slots pivoted to said frame; bolts passing through the slots; and supports to which said links are pivoted.

18. The combination, with a frame, and with a blank-carrier mounted thereon; of links adjustable on said frame; supports to which the links are pivoted; and means for rocking the frame and said supports.

19. The combination, with a swinging frame and with a blank-support carried thereby, of rocking arms to which said frame is connected; a rock-shaft connecting said arms; and bearings in which the rock-shaft is journaled.

20. The combination, with a swinging frame, of rock-arms to which said frame is connected; a rock-shaft connecting said rock-arms; bearings for the rock-shaft; a blank-support journaled for axial movement in the swinging frame; and means for indexing said blank-support.

21. The combination, with a frame having a bearing, of a head provided with a spindle mounted in said bearing; a device for supporting a blank secured to the head; a pair of rock-arms to which the frame is pivoted; a support for said rock-arms; and means for angularly adjusting said support.

22. The combination, with a swinging frame, and with means for supporting the same, of a pair of spindles journaled in said frame; a blank-support connected to one spindle; a former carried by the other spindle; means for indexing both of the spindles; and gearing for connecting said spindles.

23. The combination, with a frame, and with means for supporting the same for rocking movement, of bearings carried by the frame; spindles journaled in said bearings; gearing for connecting said spindles; a blank-support carried by one of the spindles; a former carried by the other spindle; a device against which said former is moved; a tool; and means for swinging the blank-support over the surface of said tool.

24. The combination, with a frame, of a pair of spindles journaled in said frame; means for connecting said spindles so that they will move in unison; an indexing device for one of the spindles; a blank-support carried by one of the spindles; and a former carried by the other spindle.

25. The combination, with a frame and with means for actuating the same, of a pair of spindles journaled in said frame; gearing for connecting said spindles; a blank-support; means for detachably connecting said blank-support to one of the spindles; a former carried by the other spindle; means for detachably connecting the former to said other spindle; a tool; and means for swinging the blank-support over the surface of said tool.

26. The combination, with a slide, of a support for said slide; means for angularly adjusting the support; a swinging frame carried by the slide, said frame having a bearing; a spindle journaled in said bearing; a blank-support connected to the spindle; and means for indexing the spindle.

27. The combination, with a slide, and with a plate mounted for angular adjustment thereon, of arms mounted for swinging movement on the plate; a frame; links pivoted to the arms and attached to said frame; and a blank-support carried by the frame.

28. The combination, with a support, of arms connected for swinging movement to said support; links pivoted to the arms; a blank-support; and means for connecting said blank-support with the links.

29. The combination, with a support having bearings, of a rock-shaft mounted in said bearings; arms projecting from the rock-shaft; links pivoted to the arms; a frame carried by said links between the arms; and a blank-support mounted on the frame.

30. The combination, with a support having bearings, of means whereby said support may be angularly adjusted; a rock-shaft mounted in said bearings; arms projecting from the rock-shaft; links pivoted to the arms; a frame connected to the links between said arms; and a blank-support mounted on the frame.

31. The combination, with a slide and with means for angularly adjusting said slide; of arms connected for swinging movement to said slide; links pivoted to the arms; a frame connected to said links; a blank-supporting spindle mounted in said frame; and means for securing a blank to said spindle.

32. The combination, with a slide and with means for transversely indexing said slide, of a blank-support; means for connecting said blank-support with the slide; and means for securing a blank to the blank-support.

33. The combination, with a slide and with means for transversely indexing said slide, of a plate angularly adjustable upon the slide; a blank-support; means for axially indexing said blank-support; and means for securing a blank to said blank-support.

34. The combination, with a transversely-adjustable support, of a frame; means whereby said frame may be adjusted on the support in an arcuate path; a slide mounted in a guideway of the support; means for indexing the slide; a blank-support; and means for connecting said blank-support for swinging movement to the slide.

35. The combination, with a support, of a frame having curved slots and capable of angular adjustment upon said support; means for securing said frame to the support when adjusted; a slide movable in a guideway of the frame; means for indexing the slide; a blank-supporting frame; and lever-and-link mechanism for connecting said blank-supporting frame.

36. The combination, with a slide, and with means whereby said slide may be angularly adjusted, of arms mounted for swinging movement on the slide; links pivoted to the upper ends of the arms; a frame carried by said links; a blank-support mounted on the frame; a former mounted on said frame; and an adjustable device against which the former may be forced.

37. The combination, with a cutting or polishing implement, of a blank-carrier; means for permitting a swinging movement of said blank-carrier toward and from said implement; and means for actuating the blank-carrier to impart a rolling movement to the blank-support thereby over the surface of said implement.

38. In a machine of the class specified, the combination, with a carrier, of a blank-support mounted thereon; a tool; and means for imparting movement of the blank-carrier toward and from said tool; and means for swinging the blank-carrier over the tool.

39. In a machine of the class described, the combination, with a carrier, of a tool; a blank-support on the carrier; means for imparting movement to the carrier toward and from the tool; means for actuating the carrier to roll the blank over the tool; a former; and means for indexing the blank-carrier and former.

40. In a machine of the class described, the combination, with a carrier, of a blank-support on said carrier; a former on the carrier; a device with which the former is adapted to engage; a tool; means for imparting movement to said carrier toward and from the tool; and means for swinging the carrier to carry the blank over the tool.

41. The combination, with a carrier, of a blank-support on said carrier; a former on the carrier; a tool; means for actuating the carrier toward and from said tool; a device coöperating with the former to govern the movement of the carrier; and means for actuating the carrier to roll the blank-support over said tool.

42. In a machine of the class described, a former having stops and a surface between said stops for controlling the formation of a design.

43. In a machine of the class described a former having stop-ledges and a smooth surface of an outline to control the formation of a design between said stop-ledges.

44. In a machine of the class described, the combination, with a tool, of a carrier; a blank-support on said carrier; a former for controlling the movement of the carrier; a roller coöperating with said former; and means for rotating the carrier to cause the former to travel over the roller.

45. The combination, with a carrier, of a blank-support on said carrier; a former also on the carrier; gearing connecting said former and blank-support; and means for indexing the blank-support, and, through said gearing, simultaneously indexing the former.

46. The combination, with a carrier, of a blank-support therein; a tool; and lever-and-link devices for sustaining said carrier so that it may be given a compound movement toward and from and over the tool.

47. The combination, with a carrier, of a blank-support on said carrier; links connected to the carrier; and pivoted lever-arms to which said links are articulated.

48. The combination, with a carrier, of a blank-support on said carrier; links adjustably connected to the carrier; and arms to which said links are pivoted.

49. The combination, with a carrier, of a blank-support thereon; slotted links pivoted to said carrier; bolts for securing said links when adjusted; and supports to which the links are articulated.

50. The combination, with a tool, of a blank-supporting carrier; means for swinging said carrier in an arcuate path; means for securing the carrier when thus adjusted; and means whereby the carrier may be forced toward and from the tool, and also swung over the surface of said tool.

51. The combination, with a tool, of a blank-supporting carrier; a former on said carrier; a roller coöperating with the former; means for adjusting the carrier; means for locking the carrier in its adjusted position; and means whereby the carrier may be actuated toward and from the tool.

52. The combination, with a blank-carrier, of lever-and-link mechanism for supporting the same; and an adjustable link for locking the carrier.

53. The combination, with a blank-carrier, of lever-and-link mechanism for supporting said carrier; a slotted link connecting the carrier with an element of the link mechanism; and a device for adjustably securing the link to said element.

54. The combination, with a carrier, of lever-and-link mechanism for supporting the carrier for different movements; a blank-support; means for axially indexing said blank-support; and means for transversely indexing said carrier.

In testimony whereof I affix my signature in presence of two witnesses.

CHARLES B. BISHOP.

Witnesses:
FRANCES E. BLODGETT,
CHAS. F. SCHMELZ.